(12) United States Patent
Lin et al.

(10) Patent No.: US 8,876,308 B2
(45) Date of Patent: Nov. 4, 2014

(54) DISPLAY MODULE AND ELECTRONIC DEVICE

(71) Applicant: HTC Corporation, Taoyuan County (TW)

(72) Inventors: Ming-Tien Lin, Taoyuan County (TW); Chih-Jen Hu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 90 days.

(21) Appl. No.: 13/713,000

(22) Filed: Dec. 13, 2012

(65) Prior Publication Data

US 2014/0168947 A1 Jun. 19, 2014

(51) Int. Cl.
*G09F 13/04* (2006.01)

(52) U.S. Cl.
CPC ................................. *G09F 13/0413* (2013.01)
USPC ........................................... 362/19; 362/97.1

(58) Field of Classification Search
CPC .................................................. G09F 13/0413
USPC .................................................. 362/19, 97.1
See application file for complete search history.

(56) References Cited

U.S. PATENT DOCUMENTS

| 2003/0223249 | A1* | 12/2003 | Lee et al. | 362/561 |
| 2004/0114372 | A1* | 6/2004 | Han et al. | 362/330 |
| 2005/0099790 | A1* | 5/2005 | Kang et al. | 362/31 |
| 2005/0259442 | A1* | 11/2005 | Sakurai | 362/618 |
| 2011/0149203 | A1* | 6/2011 | Kim et al. | 349/62 |
| 2013/0182412 | A1* | 7/2013 | Choi et al. | 362/97.1 |
| 2013/0286677 | A1* | 10/2013 | Poorter et al. | 362/602 |
| 2014/0036204 | A1* | 2/2014 | Doyle et al. | 349/65 |

* cited by examiner

*Primary Examiner* — Elmito Breval
(74) *Attorney, Agent, or Firm* — Jianq Chyun IP Office

(57) ABSTRACT

A display module includes a display panel, a first polarized plate, a second polarized plate, a backlight module, a frame and an adhesive tape. The display panel has a first surface and a second surface opposite to the first surface. The first polarized plate is disposed on the first surface, in which the first end of the first polarized plate extends beyond the display panel. The second polarized plate is disposed on the second surface. The backlight module is disposed under the second polarized plate. The frame surrounds the display panel and carries the backlight module. The adhesive tape is adhered to the first end of the first polarized plate and a side surface of the frame. In addition, an electronic device with the above-mentioned display module is also disclosed.

10 Claims, 4 Drawing Sheets

DISPLAY MODULE AND ELECTRONIC DEVICE

BACKGROUND OF THE DISCLOSURE

1. Field of the Application

The application generally relates to a display module and an electronic device, and more particularly, to a display module conforming to slim border design and an electronic device using the display module.

2. Description of Related Art

In recent years, along with the increasing development of science and technology industry, electronic devices such as mobile phone, tablet computer or eBook have gradually and widely used in our daily life. When these electronic devices become more popular and are developing toward the operation convenience and versatile design, for the consumers to choose these electronic devices, an important purchase factor is to prefer a display with slim border design in addition to its hardware and software functions.

In general, in order to adapt to the screen figure design trend toward light weight and large size, it usually needs to narrow the non-displaying region surrounding the screen for masking the connection circuit of display panel so as to make the display meet the slim border design requirement and increase the display region of the screen.

SUMMARY OF THE APPLICATION

Accordingly, the application is directed to a display module having a smaller non-displaying region surrounding the screen thereof, which can advance the space design flexibility inside the device, conform to the slim border design requirement and result in a larger displaying region.

The application is also directed to an electronic device using the above-mentioned display module.

The application provides a display module, which includes a display panel, a first polarized plate, a second polarized plate, a backlight module, a frame and an adhesive tape. The display panel has a first surface and a second surface opposite to the first surface. The first polarized plate is disposed on the first surface, in which the first end of the first polarized plate extends beyond the display panel. The second polarized plate is disposed on the second surface. The backlight module is disposed under the second polarized plate. The frame surrounds the display panel and carries the backlight module. The adhesive tape is adhered to the first end of the first polarized plate and a side surface of the frame.

The application also provides an electronic device, which includes a body, a display module, a transparent top cover and an optical glue. The display module is disposed in the body and includes a display module, a first polarized plate, a second polarized plate, a backlight module, a frame and an adhesive tape. The display panel has a first surface and a second surface opposite to the first surface. The first polarized plate is disposed on the first surface, in which the first end of the first polarized plate extends beyond the display panel. The second polarized plate is disposed on the second surface. The backlight module is disposed under the second polarized plate. The frame surrounds the display panel and carries the backlight module. The adhesive tape is adhered to the end of the first polarized plate and a side surface of the frame. The transparent top cover is assembled with the body, in which the center of the transparent top cover has a transparent region, the transparent region exposes a displaying region of the display panel and a portion of a non-displaying region located at a periphery of the displaying region, a periphery of the transparent top cover has a shielding region, and the shielding region covers the adhesive tape and the rest portion of the non-displaying region. The optical glue is disposed between the transparent top cover and the first polarized plate, in which the shielding region covers a portion of the optical glue.

Based on the description above, in the display module provided by the application, the first end of the polarized plate extends beyond the display panel, therefore, the extending portion of the polarized plate can be adhered by the adhesive tape and maintain the adhering area required by the adhesive tape. In addition, since the first end of the polarized plate is located at the outer side of the side edge of the display panel, so that the non-displaying region originally located between the edge of the first end of the polarized plate and the side edge of the display panel can be reduced. In other words, the design of the application can increase the size of the displaying region of the display panel or make the display module conform to slim border design requirement.

In order to make the features and advantages of the present application more comprehensible, the present application is further described in detail in the following with reference to the embodiments and the accompanying drawings.

DESCRIPTION OF THE EMBODIMENTS

Figure 1:
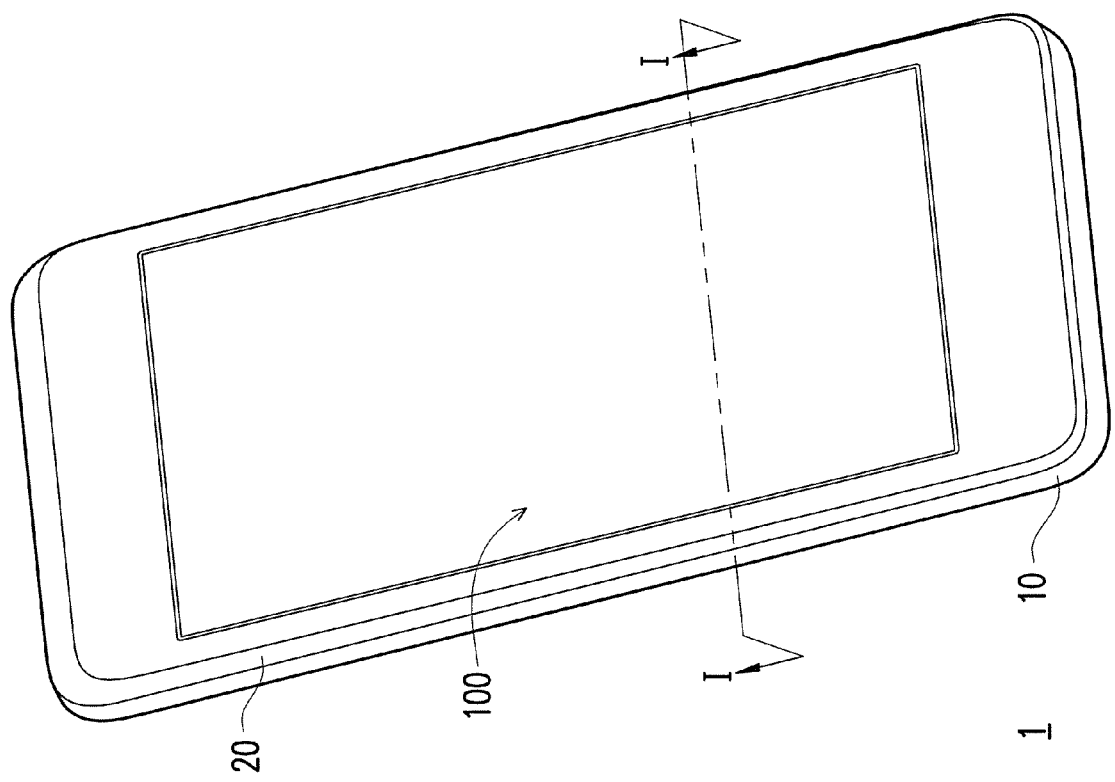
FIG. 1 is a schematic diagram of an electronic device according to an embodiment of the invention.
Figure 2:
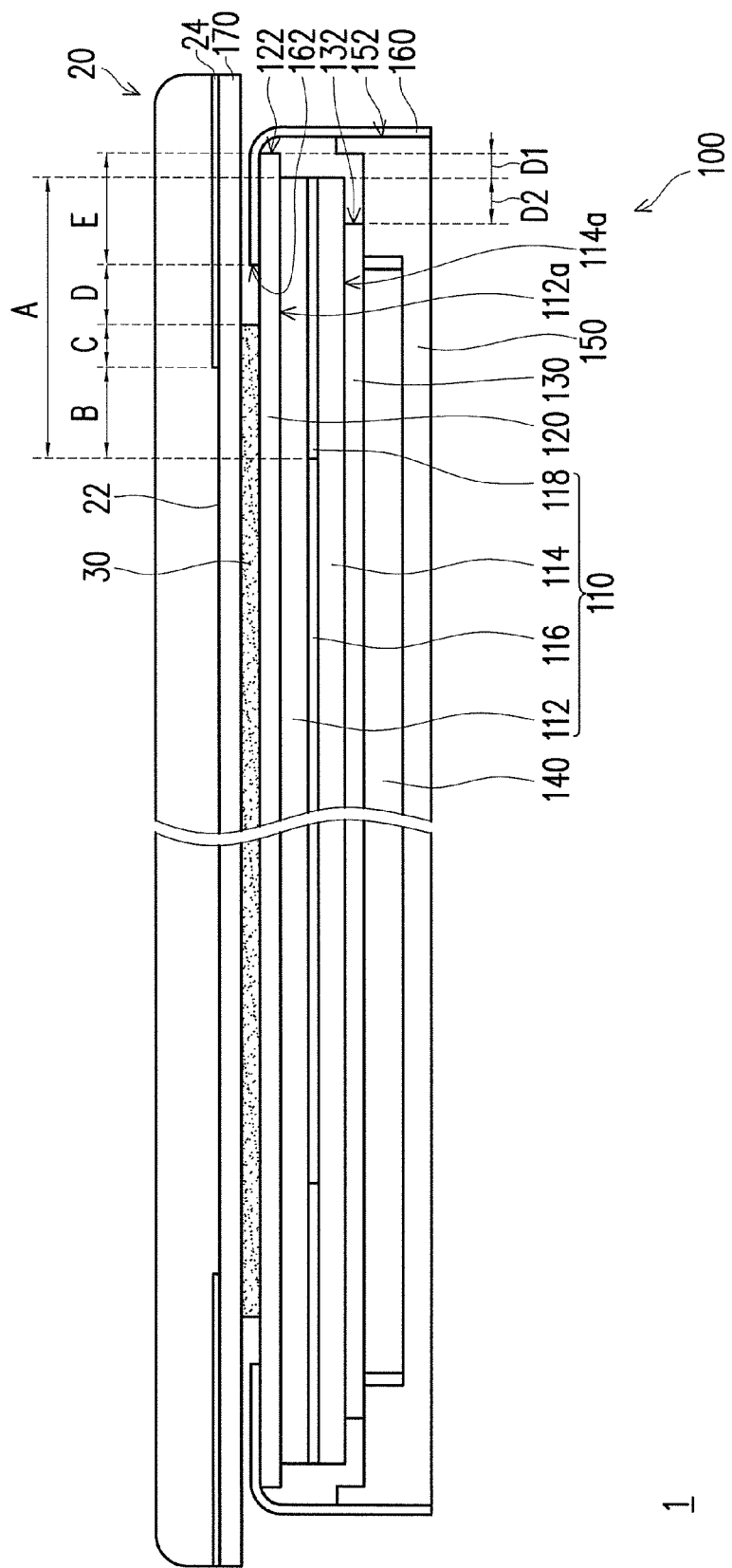
FIG. 2 is a cross-sectional diagram of the electronic device of FIG. 1 along I-I line.

FIG. 1 is a schematic diagram of an electronic device according to an embodiment of the invention and FIG. 2 is a cross-sectional diagram of the electronic device of FIG. 1 along I-I line. Referring to FIGS. 1 and 2, in the embodiment, the electronic device 1 includes a body 10, a transparent top cover 20, an optical glue 30 and a display module 100. The display module 100 is disposed in the body 10, and the transparent top cover 20 is assembled with the body 10. The optical glue 30 is adhered to the display module 100 and the transparent top cover 20. In addition, the electronic device 1 is, for example, a mobile phone, a tablet computer or an eBook. In the embodiment, the electronic device 1 is a mobile phone as an example. It should be noted that, for clarity, the aspect of the electronic device 1 in FIG. 2 is adjusted and the body 10 is not shown in FIG. 2.

The display module 100 includes a display panel 110, a first polarized plate 120, a second polarized plate 130, a backlight module 140, a frame 150 and an adhesive tape 160. The display panel 110 has a first surface 112a and a second surface 114a opposite to the first surface 112a. The first polarized plate 120 is disposed on the first surface 112a, and the first end 122 of the first polarized plate 120 extends to and beyond the display panel 110. The second polarized plate 130 is disposed on the second surface 114a. The backlight module 140 is disposed under the second polarized plate 130 for providing a backlight source to the display panel 110. The frame 150 surrounds the display panel 110 and carries the backlight module 140. The adhesive tape 160 is adhered to the first end 122 of the first polarized plate 120 and a side surface 152 of the frame 150.

The display panel 110 in the embodiment is, for example, a liquid crystal panel and includes a first substrate 112 and a second substrate 114 opposite to each other and a displaying region 116 disposed between the first substrate 112 and the second substrate 114. In addition, the first substrate 112 has a first surface 112a, the second substrate 114 has a second surface 114a, and a non-displaying region 118 is disposed at the periphery of the displaying region 116 to mask the connection circuit of the display panel 110 (not shown).

The material of the transparent top cover 20 is glass or transparent plastic, and the center of the transparent top cover 20 has a transparent region 22. The transparent region 22 exposes the displaying region 116 of the display panel 110 and a portion of the non-displaying region 118 located at the periphery of the displaying region 116, and the periphery of the transparent top cover 20 has a shielding region 24. The shielding region 24 covers the adhesive tape 160 and the rest portion of the non-displaying region 118. The optical glue 30 is disposed between the transparent top cover 20 and the first polarized plate 120, and the shielding region 24 covers a portion of the optical glue 30.

After the first end 122 of the first polarized plate 120 extends to the outer side of the display panel 110, the extending portion of the first polarized plate 120 can be adhered by the adhesive tape 160 and can maintain the adhering area required by the adhesive tape 160. In addition, since the first end 122 of the first polarized plate 120 is located at the outer side of the side edge of the display panel 110, so that the partial non-displaying region 118 originally located between the edge of the first end 122 of the first polarized plate 120 and the side edge of the display panel 110 can be reduced. As a result, the display panel 110 has a larger displaying region 116 and the display module 100 can conform to slim border design requirement.

The display module 100 in the embodiment can further include a touch panel 170 disposed between the first polarized plate 120 and the transparent top cover 20. In more details, the touch panel 170, the first polarized plate 120 and the transparent top cover 20 are adhered together to make the electronic device 1 have touch function.

The difference between the electronic device 1 in the embodiment and an electronic device 1a with a non-outstretched first polarized plate 120 is described as follows.

Figure 3:
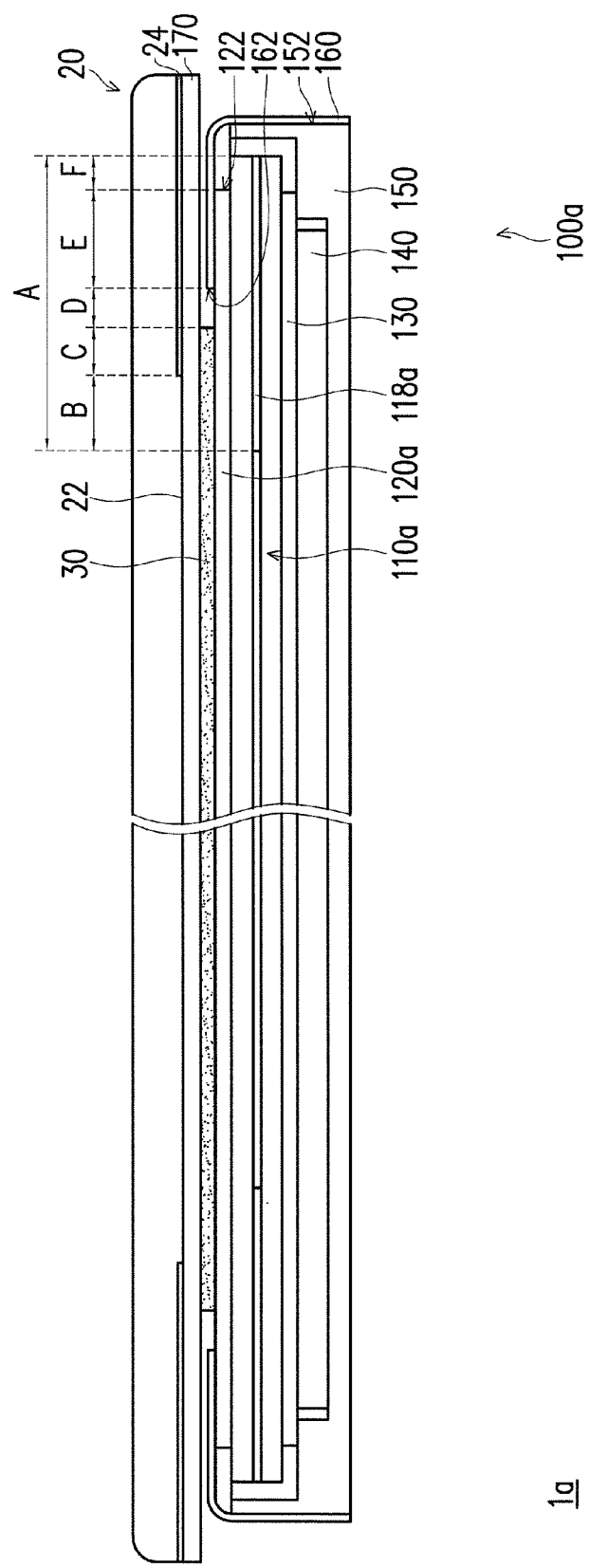
FIG. 3 is a cross-sectional diagram of the electronic device where the first polarized plate is not outstretched.

FIG. 3 is a cross-sectional diagram of the electronic device where the first polarized plate is not outstretched. Table 1 is a dimension comparison between the electronic device of the application and the electronic device of FIG. 3. Referring to FIGS. 2 and 3 and Table 1, the electronic device 1a of FIG. 3 is similar to the electronic device 1 of the embodiment, and the difference is depicted herein, in which the same of similar part notations represent the same or similar methods, which is omitted to describe.

Table 1: Table of Dimension Comparison between the Electronic Device of the Application and the Electronic Device of FIG. 3

| Item | Electronic device of FIG. 3 | Electronic device of the application |
|------|-----------------------------|--------------------------------------|
| A    | 1.4 mm                      | 1.0 mm                               |
| B    | 0.3 mm                      | 0.3 mm                               |
| C    | 0.2 mm                      | 0.2 mm                               |
| D    | 0.2 mm                      | 0.2 mm                               |
| E    | 0.5 mm                      | 0.5 mm                               |
| F    | 0.2 mm                      | +0.2 mm                              |

Specifically, the first end 122 of the first polarized plate 120 in the embodiment is protruded from a side edge of the display panel 110 by at least a first distance D1. The first end 132 of the second polarized plate 130 is adjacent to the first end 122 of the first polarized plate 120 and the edge of the first end 132 of the second polarized plate 130 is separated from the adjacent side edge of the display panel 110 by a second distance D2, and the sum of the first distance D1 and the second distance D2 is greater than 0 but less than 1 mm, and the sum in the embodiment is 0.4 mm as an example, in which the first distance D1 is greater than 0 but less than 0.5 mm and the first distance D1 in the embodiment is 0.5 mm as an example.

In addition, the first end 162 of the adhesive tape 160 and the first polarized plate 120 have an overlapping area, and the edge of the first end 162 of the adhesive tape 160 and the edge of the first end 122 of the first polarized plate 120 respectively located at the opposite two sides of the overlapping area are separated from each other by a third distance E. The third distance D3 is greater than 0.2 mm but less than 0.8 mm, and the third distance E in the embodiment is 0.5 mm as an example.

In the embodiment, A represents the dimension of the non-displaying region 118 and the non-displaying region 118a, B represents the dimension between the edge of the displaying region 116 and the edge of the shielding region 24, C represents the dimension of a position of the optical glue 30 covered by the shielding region 24, D represents the dimension between the edge of the optical glue 30 and the edge of the adhesive tape 160, E represents a third distance and F respectively represents the dimension between the edge of the first end 122 of the first polarized plate 120 and the edge of the display panel 110 and the dimension between the edge of the first end 122a of the first polarized plate 120a and the edge of the display panel 110a. By changing the distance between the edge of the first end 122 of the first polarized plate 120 and the edge of the display panel 110, the first polarized plate 120 in the display module 100 of the embodiment can be extended, and the edge of the first end 122 of the first polarized plate 120 is protrusive relatively to the edge of the display panel 110, in which the extending distance of the first polarized plate 120 is, for example, the sum of the first distance D1 and the second distance D2.

The extending portion of the first polarized plate 120 is available for the adhesive tape 160 to be adhered and the reliability of the display module 100 can be kept without changing the third distance E. In addition, the edge of the first end 122 of the first polarized plate 120, relatively to the edge of the first end 122a of the first polarized plate 120a in FIG. 3, is extended by the sum of the first distance D1 and the second distance D2. Therefore, the partial non-displaying region 118 between the edge of the first end 122a of the first polarized plate 120a and the side of the display panel 110 as shown by FIG. 3 can be reduced. In other words, in comparison with the non-displaying region 118a of FIG. 3, the non-displaying region 118 of the embodiment is reduced by the sum of the first distance D1 and the second distance D2, for example, 0.4 mm is reduced. As a result, in comparison with the display panel 110a of FIG. 3, the display panel 110 of the embodiment has a larger displaying region 116 to make the display module 100 satisfy the slim border design requirement.

Figure 4:
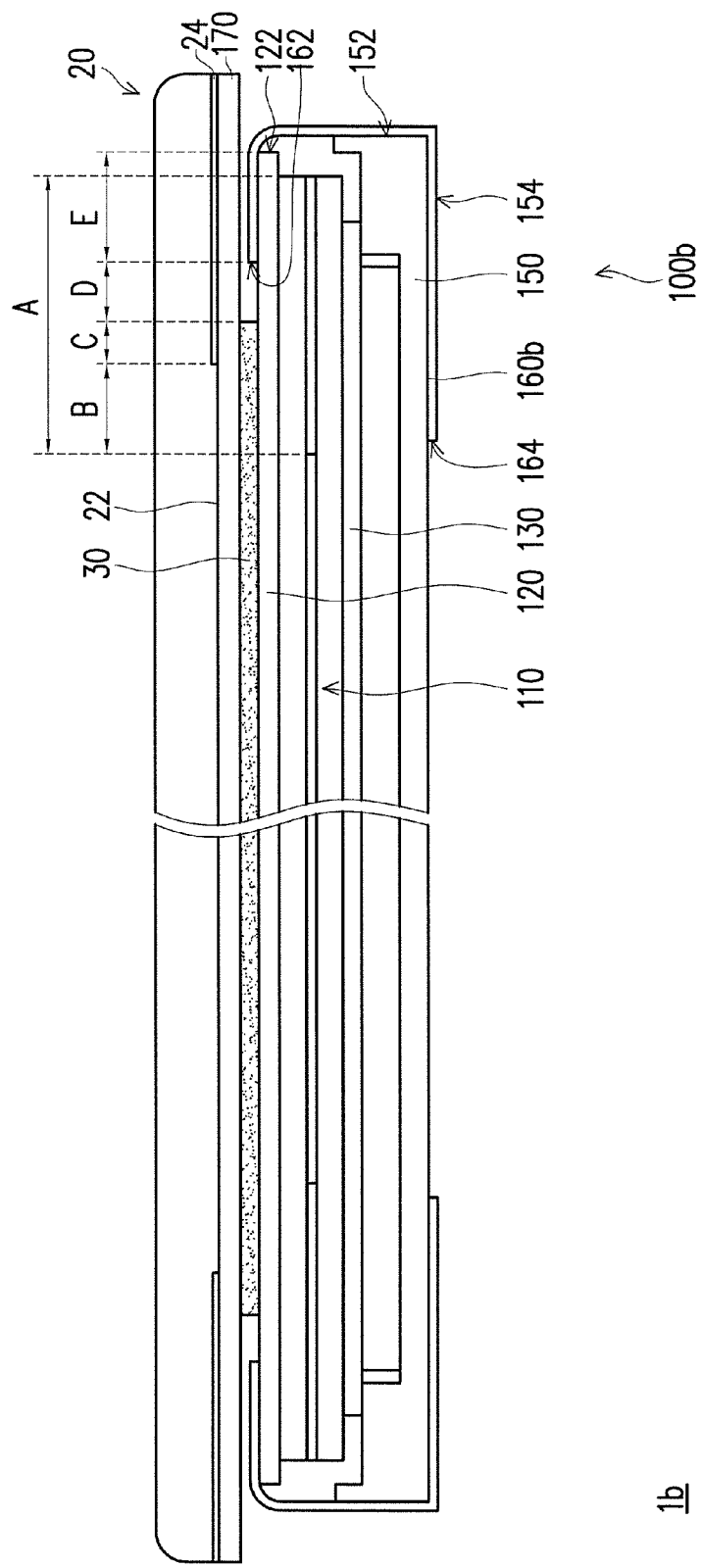
FIG. 4 is a schematic diagram of an electronic device according to another embodiment of the invention.

FIG. 4 is a schematic diagram of an electronic device according to another embodiment of the invention. Referring to FIG. 4, the electronic device 1b of the embodiment is similar to the electronic device 1 of FIG. 2, and the difference between the two embodiments of FIG. 4 and FIG. 2 is depicted herein, in which the same of similar part notations represent the same or similar methods, which is omitted to describe. In the embodiment, the adhesive tape 160b further extends to a bottom surface 154 of the frame 150 from the side surface 152 of the frame 150, and the second end 164 of the adhesive tape 160b is adhered onto the bottom surface 154 of the frame 150 or adhered to the side surface 152 of the frame 150 and the bottom surface 154 thereof. In this way, the display panel 110 and the frame 150 are fixed.

In summary, in the application, the first polarized plate extends to the outer side of the display panel, therefore, the extending portion of the first polarized plate can be adhered by the adhesive tape without affecting the reliability of the backlight module. In addition, since the edge of the first end of the first polarized plate is protruded from the side edge of the display panel, so that the non-displaying region originally located between the edge of the first end of the first polarized plate and the side edge of the display panel can be reduced. In other words, the display panel of the application has a larger displaying region to make the display module satisfy the slim border design requirement.

It will be apparent to those skilled in the art that the descriptions above are several preferred embodiments of the application only, which does not limit the implementing range of the application. Various modifications and variations can be made to the structure of the application without departing from the scope or spirit of the application. The claim scope of the application is defined by the claims hereinafter.

What is claimed is:

1. A display module, comprising:
    a display panel, having a first surface and a second surface opposite to the first surface;
    a first polarized plate, disposed on the first surface, wherein an end and an extending portion of the first polarized plate extend beyond the display panel;
    a second polarized plate, disposed on the second surface;
    a backlight module, disposed under the second polarized plate;
    a frame, surrounding the display panel and carrying the backlight module; and
    an adhesive tape, adhered to the end and the extending portion of the first polarized plate and a side surface of the frame.

2. The display module as claimed in claim 1, wherein the end of the first polarized plate is protruded from a side edge of the display panel by at least a first distance and the first distance is greater than 0 but less than 0.5 mm.

3. The display module as claimed in claim 2, wherein an end of the second polarized plate is adjacent to the end of the first polarized plate, an edge of the end of the second polarized plate is separated from the side edge of the adjacent display panel by a second distance, and sum of the first distance and the second distance is greater than 0 but less than 1 mm.

4. The display module as claimed in claim 1, wherein the adhesive tape extends and is adhered to a bottom surface of the frame from the side surface of the frame.

5. The display module as claimed in claim 1, wherein a first end of the adhesive tape and the first polarized plate have an overlapping area, an edge of the first end and an edge of the end of the first polarized plate respectively located at opposite two sides of the overlapping area are separated from each other by a third distance, and the third distance is greater than 0.2 mm but less than 0.8 mm.

6. An electronic device, comprising:
    a body;
    a display module, disposed in the body and comprising:
        a display panel, having a first surface and a second surface opposite to the first surface;
        a first polarized plate, disposed on the first surface, wherein an end and an extending portion of the first polarized plate extend beyond the display panel;
        a second polarized plate, disposed on the second surface;
        a backlight module, disposed under the second polarized plate;
        a frame, surrounding the display panel and carrying the backlight module; and
        an adhesive tape, adhered to the end and the extending portion of the first polarized plate and a side surface of the frame;
    a transparent top cover, assembled with the body, wherein a center of the transparent top cover has a transparent region, the transparent region exposes a displaying region of the display panel and a portion of a non-displaying region located at a periphery of the displaying region, a periphery of the transparent top cover has a shielding region, and the shielding region covers the adhesive tape and a rest portion of the non-displaying region; and
    an optical glue, disposed between the transparent top cover and the first polarized plate, wherein the shielding region covers a portion of the optical glue.

7. The electronic device as claimed in claim 6, wherein the end of the first polarized plate is protruded from a side edge of the display panel by at least a first distance and the first distance is greater than 0 but less than 0.5 mm.

8. The electronic device as claimed in claim 7, wherein an end of the second polarized plate is adjacent to the end of the first polarized plate, an edge of the end of the second polarized plate is separated from the side edge of the adjacent display panel by a second surface, and sum of the first distance and the second distance is greater than 0 but less than 1 mm.

9. The electronic device as claimed in claim 6, wherein the adhesive tape extends and is adhered to a bottom surface of the frame from the side surface of the frame.

10. The electronic device as claimed in claim 6, wherein a first end of the adhesive tape and the first polarized plate have an overlapping area, an edge of the first end and an edge of the end of the first polarized plate respectively located at opposite two sides of the overlapping area are separated from each other by a third distance, and the third distance is greater than 0.2 mm but less than 0.8 mm.

* * * * *